May 28, 1968     B. S. L. STRANDBERG     3,385,135
MECHANICAL REDUCTION GEAR SYSTEM
Original Filed Feb. 24, 1965     4 Sheets-Sheet 1

INVENTOR.
BENGT SIGURD LENNART STRANDBERG
BY Hane and Nydick
ATTORNEYS

May 28, 1968  B. S. L. STRANDBERG  3,385,135
MECHANICAL REDUCTION GEAR SYSTEM
Original Filed Feb. 24, 1965  4 Sheets-Sheet 3

INVENTOR.
BENGT SIGURD LENNART STRANDBERG
BY Hane and Nydick
ATTORNEYS

United States Patent Office 3,385,135
Patented May 28, 1968

3,385,135
MECHANICAL REDUCTION GEAR SYSTEM
Bengt Sigurd Lennart Strandberg, Gullanget, Sweden, assignor to Aktiebolaget Hagglund & Soner, Ornskoldsvik, Sweden, a corporation of Sweden
Continuation of application Ser. No. 434,861, Feb. 24, 1965. This application July 26, 1967, Ser. No. 656,296
5 Claims. (Cl. 74—800)

This application is a continuation of application Ser. No. 434,861, filed Feb. 24, 1965, now abandoned.

The present invention relates to a mechanical reduction gear system for coupling a drive shaft and a driven shaft, and particularly to a reduction gear system mounted within a gear casing structurally combined with a drive motor, such as an electric motor, a Diesel engine or an Otto engine. The drive motor may be directly secured to the gear casing, for instance, by suitable flanges, to constitute the input shaft of the gear system, or the drive shaft of the motor may be coupled to the input shaft of the gear system.

More specifically, the invention relates to a mechanical reduction gear system in which the reduction or step-down is effected by providing two conical or bevel gears with a tooth differential of, for instance, one tooth and an angle between the axes of the two gears which is less than 180°; that is, $(180-\alpha)°$. The input shaft of the gear system. which may be the shaft of the drive motor, mounts an eccentric journal upon which one end of a bearing flange or extension of the first gear of the gear system is journaled. The axis of this gear and the axis of the drive shaft or the output shaft of the gear system define the aforementioned angle $\alpha$. The other end of the bearing flange is journaled about the intersection A of the rotational axes of the two gears of the system by means of a suitable bearing seated on the output shaft.

It is an object of the invention to provide a novel and improved mechanical reduction gear system of the general kind above referred to which has a low operational noise level and a constant rotational speed, and which can be manufactured by mass production techniques as a structural subassembly of a drive motor, such as an electric motor.

Another object of the invention is to provide a novel and improved reduction gear system which operates in the manner of a planetary gear system and which requires comparatively few gear components and small space. More particularly, when structurally combined with an electric motor, the external diameter of the gear case may be the same as that of the motor, or even less. The dimensional difference between a standard high r.p.m. electric motor and an electric motor structurally combined with the reduction gear system according to the invention to obtain a low r.p.m. output entails merely a lengthening by about 30% to 50% of the usual generally cylindrical motor casing.

Conical gearings using a universal joint as heretofore known have the disadvantage that variations in the joint with respect to the angular velocity $\omega$ cause irregularities in the rate of rotation of the gearing.

To eliminate such rotational irregularities, the invention according to one exemplification provides a structural combination of a planetary gearing and a ball-type coupling, in which the balls obtain a uniform movement by means of a pivot pin and guide tracks. The pivot pin and guide tracks guide the balls so that the same always rotate about an axis which defines the angle $$\frac{(180-\alpha)°}{2}$$

that is which halves the angle defined by the axis of the first gear as previously described.

The inventive concept may be modified in several ways without departing from its basic principle.

The conical planetary gearing of the invention may comprise, for instance, one gear with circularly curved peripheral teeth or wedges which engage a rectilinear or circularly curved track on the gear casing for coupling said one gear with the casing. The coupling can also be effected within the scope of the invention by means of balls and guide grooves therefor.

If, for instance, in a coupling as just described, a first gear with sixty teeth and a coacting second gear with fifty-nine teeth are provided, whereby the first gear is blocked against rotation and the second gear is secured on the output shaft of the gear system, a reduction is obtained between the rotation of the shaft having the aforementioned eccentric journal and the output shaft. For each revolution of the shaft having the eccentric journal, the point of tooth engagement between the two gears performs one revolution about the second gear, while the first gear stands still. In other words, for a gear ratio of 60:59 teeth, the second gear turns through an angle corresponding to the spacing of one tooth on the first gear for each revolution of the shaft having the eccentric journal. Accordingly, a reduction of 60:1 is obtained. For instance, when an electric motor making one thousand five hundred r.p.m. is structurally combined with the afore-described gear system of the invention by providing the eccentric journal on the drive shaft of the motor, the reduction ratio is 1500:60=25 r.p.m. at the output shaft of the gear system.

The differential between the teeth of the first and second gears may be selected within a wide range. It may be one tooth or two or more teeth, thus providing a high selectivity of the reduction ratio between the input side and the output side of the gear system.

Other and further objects, features and advantages of the invention will be pointed out hereinafter and set forth in the appended claims constituting part of the application.

In the accompanying drawing several preferred embodiments of the invention are shown by way of illustration, and not by way of limitation.

Figure 1:
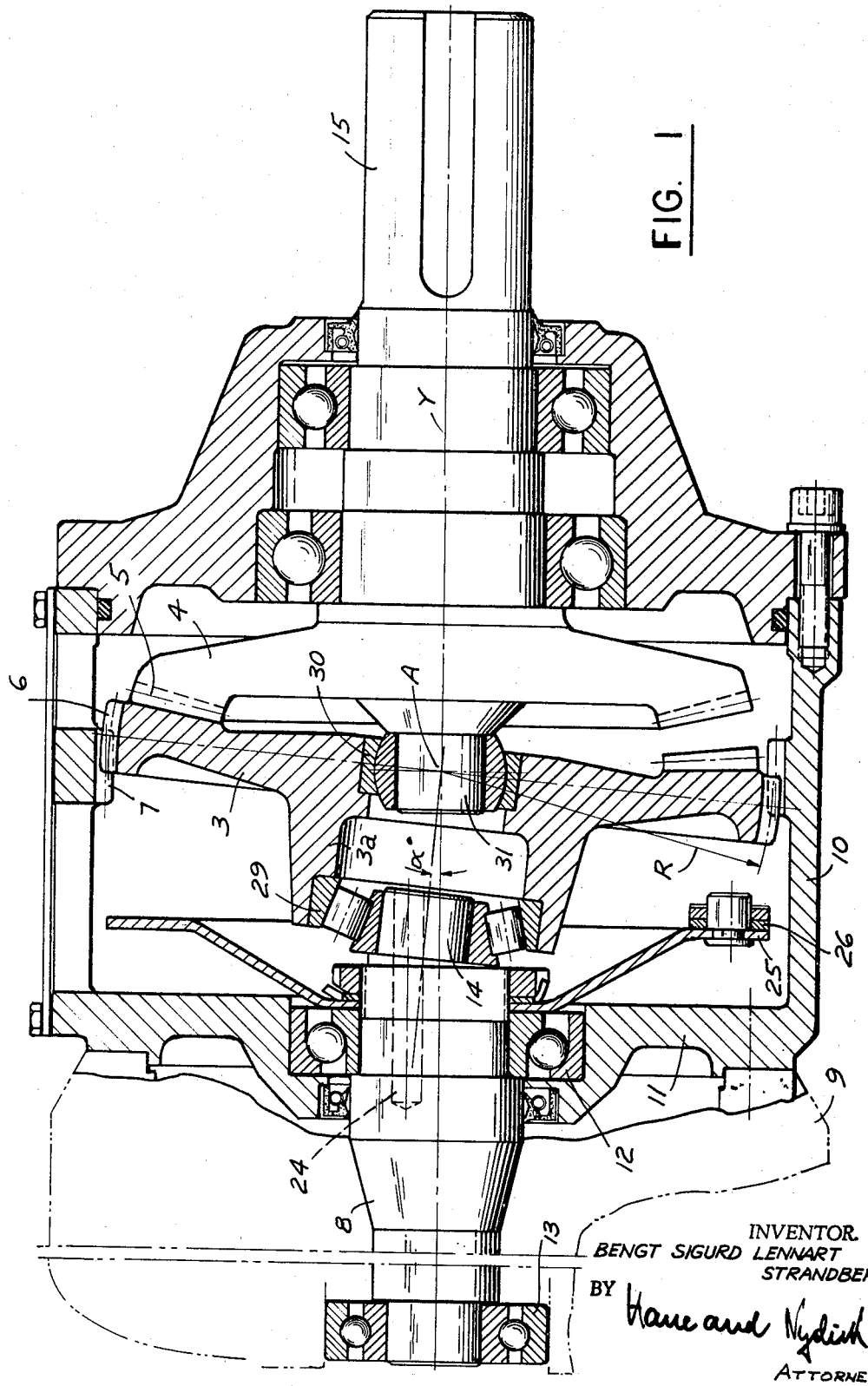
FIG. 1 is a lengthwise sectional view of a reduction gear system according to the invention.

Referring first to FIG. 1 in detail, the reduction gear system exemplified in this figure operates in the manner of a conical planetary gear system. It comprises a first gear 3 which is in engagement with a second gear 4 at the tooth area 5. Gear 3 has an extended hub portion 3a one end of which is supported on a suitable bearing, such as an axially and radially supported bearing 29 seated on an eccentric journal 14 secured to or integral with an input shaft 8 of the gear system. Shaft 8 is supported by bearings 12 and 13 and should be visualized as being coupled to or constituting the drive shaft of a suitable and conventional diagrammatically indicated electric motor 9. The motor may be secured to casing 10 by means of a flange 11 of the casing. The mounting flange 11 may of course also constitute hub part of the motor shell. The other end of hub extension 3a is supported by a bearing shown as a spherical bearing comprising a bearing bush or shell 30 and a journal 31. The journal is secured to or integral with an output shaft 15 of the gear system.

Gear 3 has at its periphery spherically or circularly curved teeth 6, as is indicated by the radius R. These teeth are in mesh with straight teeth 7 formed on an inner wall portion of casing 10, gear 3 and casing 10 having the same number of teeth. The coacting teeth 6 and 7 operate in the manner of an involute coupling, in which the spherical or circular configuration of the teeth of gear 3 permits a slanting of the gear at an angle which is equal to or greater than the angle $\alpha$ indicated in the figure. The slant of gear 3 and thus the engagement thereof with gear 4 are obtained by the afore-described eccentric journal 14 which maintains gear 3 at the angle $\alpha$ in reference to the center line Y—Y which constitutes the common axis of input shaft 8 and output shaft 15. Rotation of shaft 8 and the rotation of eccentric journal 14 in unison therewith will cause the engaged teeth area 5 to travel about gear 4.

Gear 4 should be visualized as having fewer teeth than has gear 3. Assuming, for instance, that gear 3 has sixty teeth and gear 4 has fifty-nine teeth, then shaft 8 must perform sixty revolutions to obtain one complete revolution of gear 4 and with it of output shaft 15.

Other suitable ratios of teeth may of course also be used. The equation of the reduction ratio is:

$$r = \frac{g_1}{g_1 - g_2}$$

wherein $r$ is the reduction in the gear system, $g_1$ is the first gear (gear 3) and $g_2$ the second gear (gear 4). Gear 3, for instance, may have twenty-three teeth and gear 4 may have twenty-two teeth, in which case the reduction ratio would be 23:1.

It is often necessary, or at least advisable, to balance the weight of gear 3. Suitable balancing means are shown as comprising a hub extension 25 to which one or several balancing weights 26 may be detachably secured. The input shaft 8 may be independently balanced by one or several axial bores 24 of selected length to compensate for any imbalances which may be introduced into the system by the eccentric journal 14.

Figure 2:
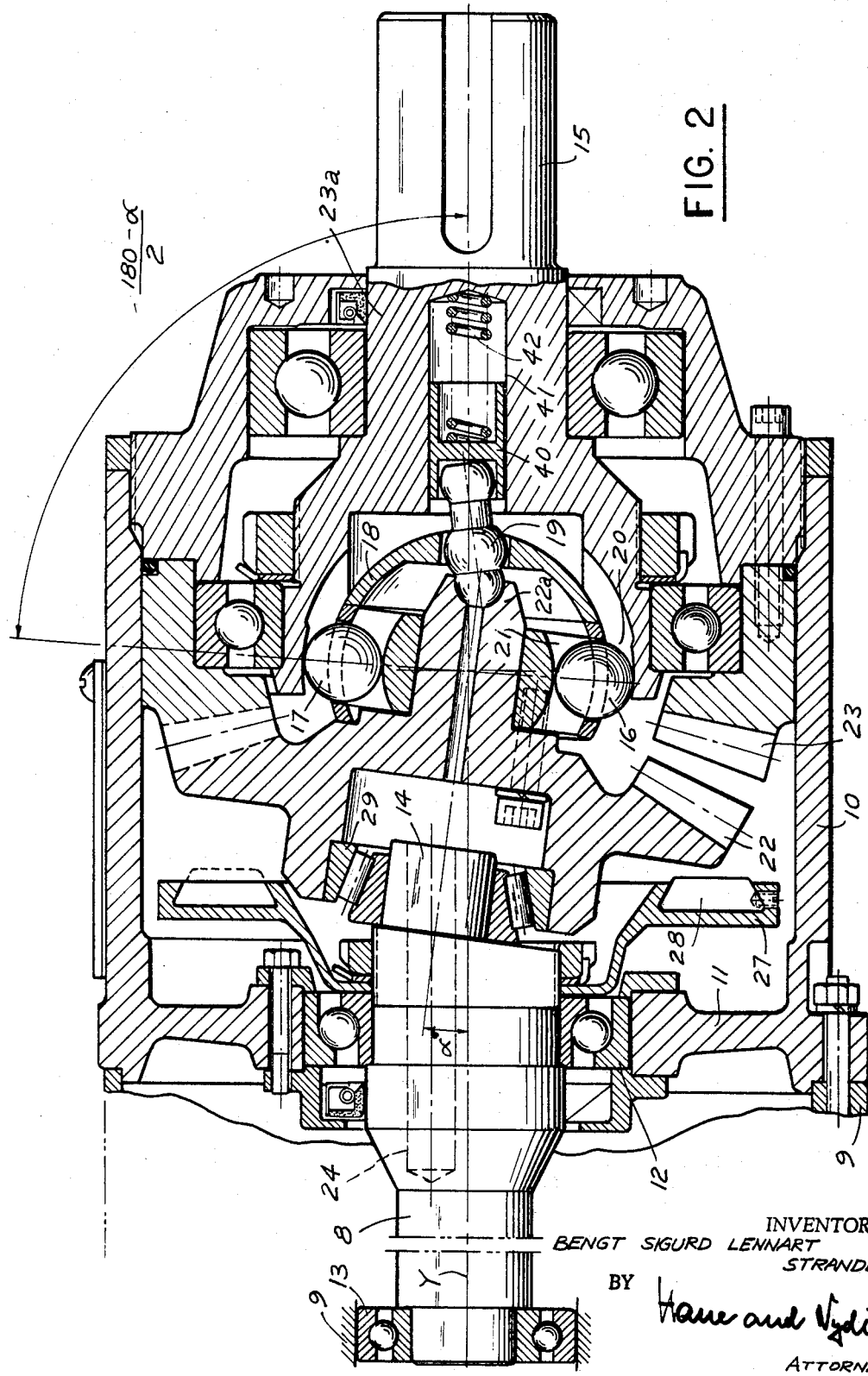
FIG. 2 is a similar sectional view showing a modification of the gear system.

The reduction gear system as shown in FIG. 2 is similar in principle to the gear system described in connection with FIG. 1. The same reference numerals are used to designate corresponding components.

The gear system comprises a first gear 22 and a second gear 23 fixedly secured in casing 10. The support of gear 22 is different from that of the corresponding gear 3 of FIG. 1, in that the spherical bearing 30, 31 of FIG. 1 is replaced by a ball-type coupling. This coupling comprises balls 16 and 17 which are guided by a circularly curved guide track 18 and a control pin 19. Pin 19 is pivoted at one end in a hub extension 22a of gear 22 and at the other end in a guide sleeve 40 lengthwise slidable in a bore 41 formed in a hub extension 23a of second gear 23. A loaded coil spring 42 urges control pin 19 toward hub 22a of gear 22. Guide track 18 and control pin 19 guide the balls in radial grooves 20 and 21 so that the same always divide the angle of slant (180—$\alpha$)° of gear 22 in reference to the center line Y—Y into two equal angles of (180—$\alpha$)°:2, whereby a uniform rate of angular velocity $\omega$ is obtained. Six or eight balls in circumferentially uniform spacing may be advantageously used.

Ball-type couplings of the type herein referred to are known in the art, but heretofore they have not been used in structural coaction with a conical gear system driven by means of an eccentric member. The inventor has found that such combination produces a uniform angular rate of velocity $\omega$, instead of the somewhat irregular rotation as is obtainable, for instance, with the reduction gear system according to Swedish Patent 155,488 using a simple universal joint.

As is apparent from FIG. 2, conical gear 23 is fixedly mounted in casing 10, while gear 22 is coupled with output shaft 15 via a ball-type coupling rotating with a substantially constant angular velocity. The planetary rotation is performed in the system according to FIG. 2 by gear 22 rotating with shaft 15, whereas according to FIG. 1, gear 3 performs the planetary rotation and is rotatably supported in casing 10, while gear 4 rotates in unison with output shaft 15.

The concept of the invention may be varied in several ways. For instance, the coupling effected by circularly curved teeth 6 and 7 may be replaced by balls and spherically or circularly curbed guide grooves for the same. The coupling between the first and second gears of the gear system may also be effected by lugs, rollers or sleeves, whereby the sleeves may be formed of an elastic material to effect uniform rotation. Such an arrangement is particularly suitable in connection with a gear system in which gear 3—that is, the first gear—performs the planetary rotation and the gear casing is of large size, as is required for heavy loads. An elastic coupling in the form of leather or rubber disks can also be provided by mounting the coupling members of such coupling on the gear performing the planetary movement and casing 10, respectively. Gear systems using such elastic couplings are particularly suitable when the system is designed for a comparatively small torque.

FIGS. 3 through 10 show several coupling means for coupling the planetary gear with the casing. More specifically, all the exemplifications illustrated in FIGS. 3 through 10 illustrate the coupling of gear 3 of FIG. 1 with casing 10. However, it should be understood that the exemplified coupling means may also be used in a gear system such as is shown in FIG. 2. The same reference numerals are used to designate corresponding components.

Figure 3:
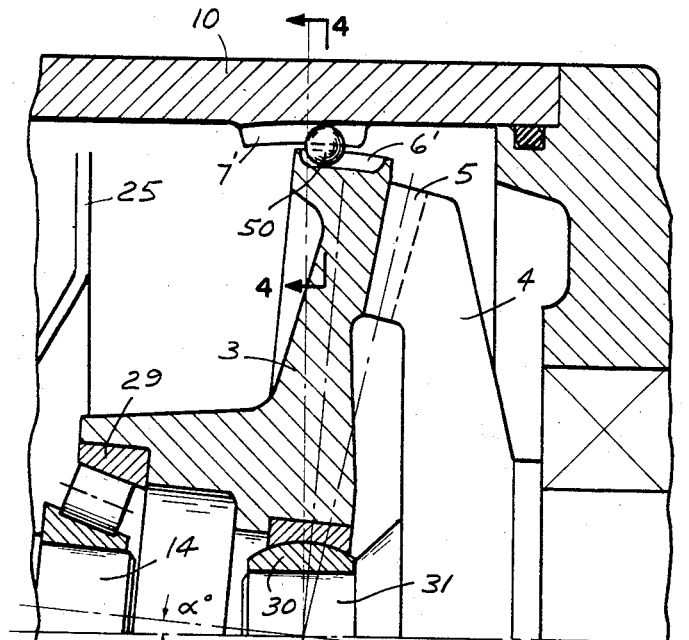
FIG. 3 is a fragmentary view of a further modification of the gear system of FIG. 1.
Figure 4:
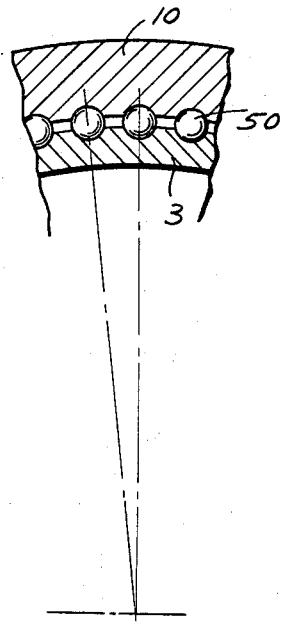
FIG. 4 is a fragmentary sectional view taken on line 4—4 of FIG. 3.

According to FIGS 3 and 4, coupling is effected by means of balls 50, which are guided in a circumferentially curved groove $6^1$ on the periphery of gear 3 and a guide track $7^1$, also circularly curved, formed on casing 10.

Figure 5:
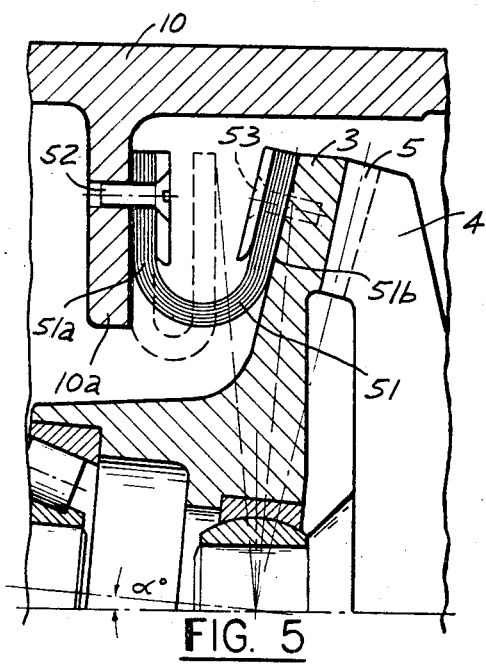
FIG. 5 is a fragmentary view of a further modification of the gear system of FIG. 1.

According to FIG. 5, coupling between gear 3 and casing 10 is effected by a generally U-shaped elastic member 51, one branch 51a of which is suitably secured to a bracket 10a of casing 10, for instance, by screw bolts 52, and the other branch 51b of which is suitably secured to gear 3, for instance, by screw bolts 53. As is shown, the closed or bight end of member 51 faces toward the axis of gear 3 in a generally radial direction. The deformation which member 51 may experience when casing 10 and gear 3 perform angular movements in reference to each other is indicated by dotted lines.

Figure 6:
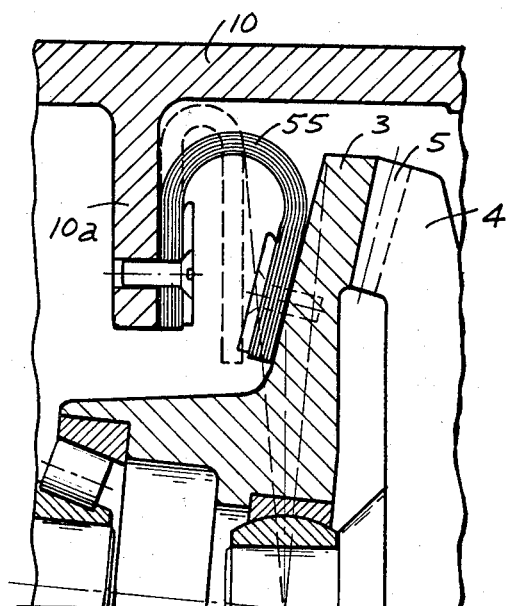
FIG. 6 is a fragmentary sectional view similar to FIG. 5, showing a still further modification of the gear system of FIG. 1.

The arrangement of FIG 6 is similar to that of FIG. 5 in that a generally U-shaped elastic member 55 is provided. Member 55 is mounted facing in the direction opposite that of member 51, but is also generally radially directed.

Figure 7:
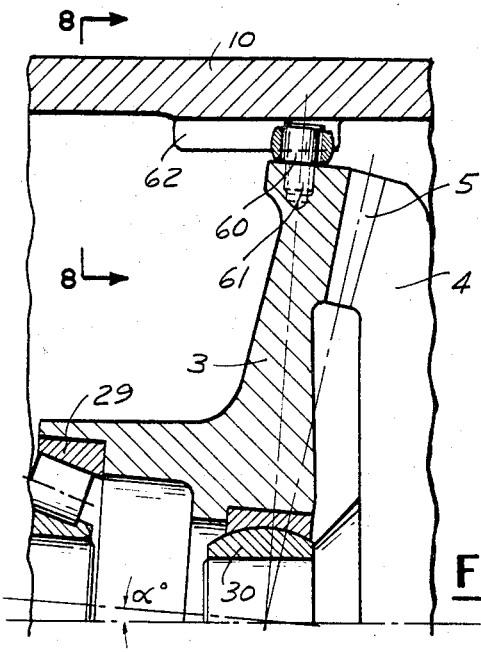
FIG. 7 is a fragmentary sectional view of still another modification of the gear system of FIG. 1.
Figure 8:
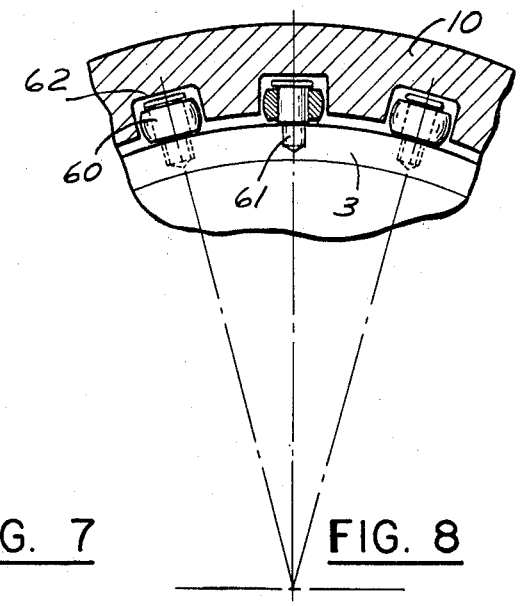
FIG. 8 is a section taken on line 8—8 of FIG. 7.

FIGS. 7 and 8 show an arrangement in which coupling between gear 3 and casing 10 is effected by lugs 60 rotatably mounted on the periphery of gear 3 by means of threaded pins 61 or other suitable fastening means and engaging grooves or guide tracks 62 formed in casing 10.

Figure 9:
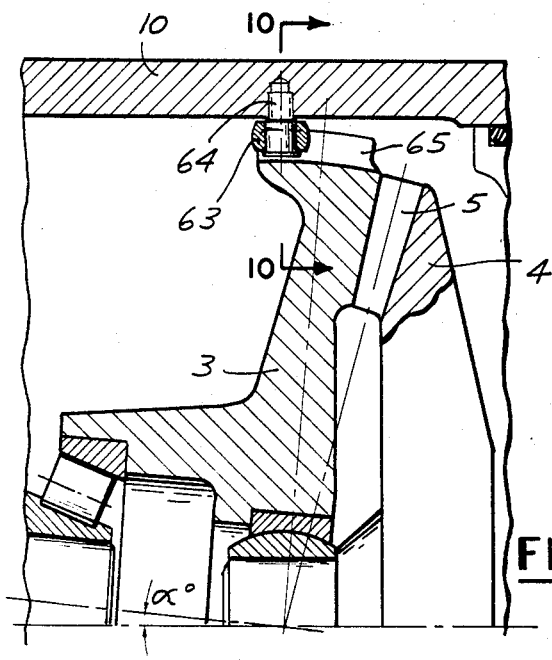
FIG. 9 is a fragmentary view of still another modification suitable for the gear system of FIG. 1.
Figure 10:
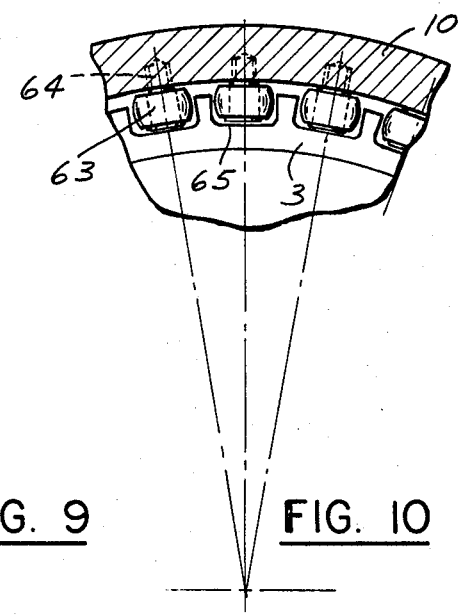
FIG. 10 is a section taken on line 10—10 of FIG. 9.

FIGS. 9 and 10 show a reversal of the arrangement of FIGS. 7 and 8, in that lugs 63 are rotatably mounted in casing 10 by suitable fastening means, such as threaded pins 64, and engage grooves or tracks 65 formed in the periphery of gear 3.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A mechanical reduction gear assemblage coupling a drive shaft (8) and a driven shaft (15) for driving the driven shaft at a predermined rate of reduction, said gear assemblage comprising in combination:
    (a) a stationary gear casing (10);
    (b) a drive shaft (8) and a driven shaft (15) rotatably supported by said casing (10) in axial alignment with each other and extending into the casing;
    (c) a first journal (14) secured to said drive shaft (8) eccentrically in reference to the rotational axis thereof;
    (d) a primary gear (3) having an axially extended hub, the outer end of the hub being rotatably seated on said eccentric journal (14);
    (e) a second journal (31) mounted co-axially with said shafts and having a peripheral bearing surface convexly curved in reference to the axes of the shafts, the inner end of the hub of the primary gear having a concave bearing surface (30) rotatably seated on said second journal to import to said primary gear (3) a non-rotational but cyclically nutating motion in response to a rotation of said drive shaft;
    (f) a secondary gear (4) fixedly mounted on said driven shaft, having on its side facing the primary gear conically disposed teeth;
    (g) a toothed ring (7) provided on an inner wall surface of said casing (10) concentrically with the axis of the drive shaft (8), the teeth of said ring extending lengthwise of said axis;
    (h) said primary gear (3) having a peripheral first ring (6) of teeth in mesh with said toothed ring (7) in any nutational position of the primary gear and on its side facing the secondary gear a second ring (5) of teeth in mesh with the teeth of the secondary gear, the number of teeth of the first ring of the primary gear being equal with the number of teeth of the casing ring and the number of teeth of the second ring of the primary gear being different from the number of teeth of the secondary gear;
    (i) the radial center plane (B—B) of the toothed ring (7) on the casing (10), the radial center plane (C—C) of the peripheral toothed ring (6) on the primary gear (3) and the planes (D—D; E—E) of the meshing teeth (5) of the primary gear (3) and the secondary gear (4) all intersect at a common point (A), said common point constituting the center of the concave bearing surface (30) of the second journal (31).

2. A gear assemblage according to claim 1 wherein said second journal is secured on said driven shaft.

3. A gear assemblage according to claim 1 wherein the teeth of the casing ring are of equal height along the axial width of the casing ring, and the teeth of said first ring of the primary gear are substantially spherically curved in reference to the center axis of said primary gear.

4. A gear assemblage according to claim 1 and comprising balancing means for said primary gear, said balancing means including support means generally radially extending from said drive shaft and secured thereon, and weight means detachably secured to said support means.

5. A gear assemblage according to claim 1 wherein said drive shaft includes at least one lengthwise bore of selected depth.

References Cited

UNITED STATES PATENTS

| | | | |
|---|---|---|---|
| 1,671,496 | 5/1928 | Trumpler | 74—800 |
| 1,671,497 | 5/1928 | Trumpler | 74—800 |
| 1,748,907 | 2/1930 | Vallance | 74—800 |
| 2,010,899 | 8/1935 | Rzeppa | 64—21 |
| 2,378,507 | 6/1945 | Sharpe | 74—804 X |
| 2,699,690 | 1/1955 | Kobler | 74—800 |
| 2,830,454 | 4/1958 | Karn | 74—800 X |
| 2,908,151 | 10/1959 | Wahlmark | 64—21 |
| 3,258,994 | 7/1966 | Gorfin | 74—800 |
| 959,394 | 5/1910 | Salomo | 74—800 |

FOREIGN PATENTS

| | | |
|---|---|---|
| 6,439 | 11/1906 | France. |
| 29,077 | 12/1921 | Denmark. |
| 174,873 | 2/1922 | Great Britain. |

DONLEY J. STOCKING, *Primary Examiner.*

ARTHUR T. McKEON, *Examiner.*